United States Patent Office 3,425,739
Patented Feb. 4, 1969

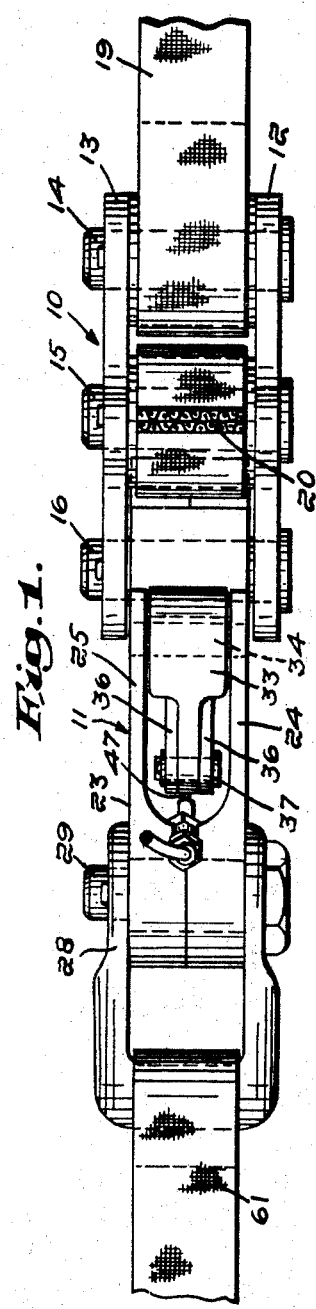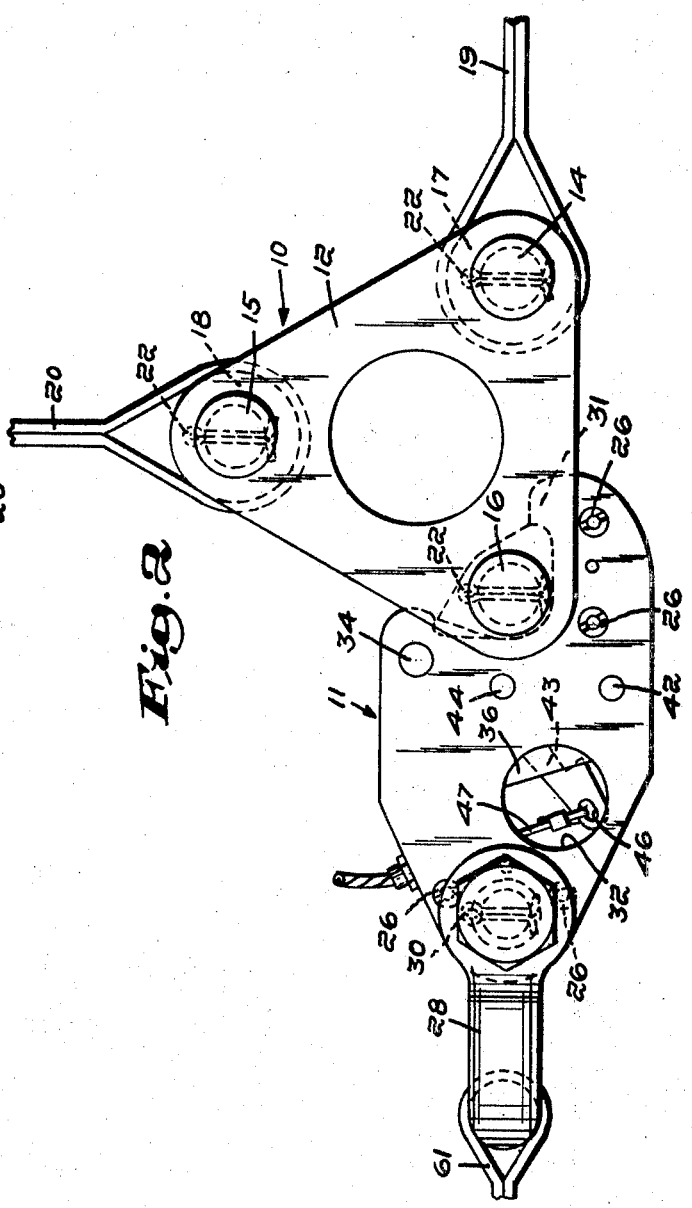

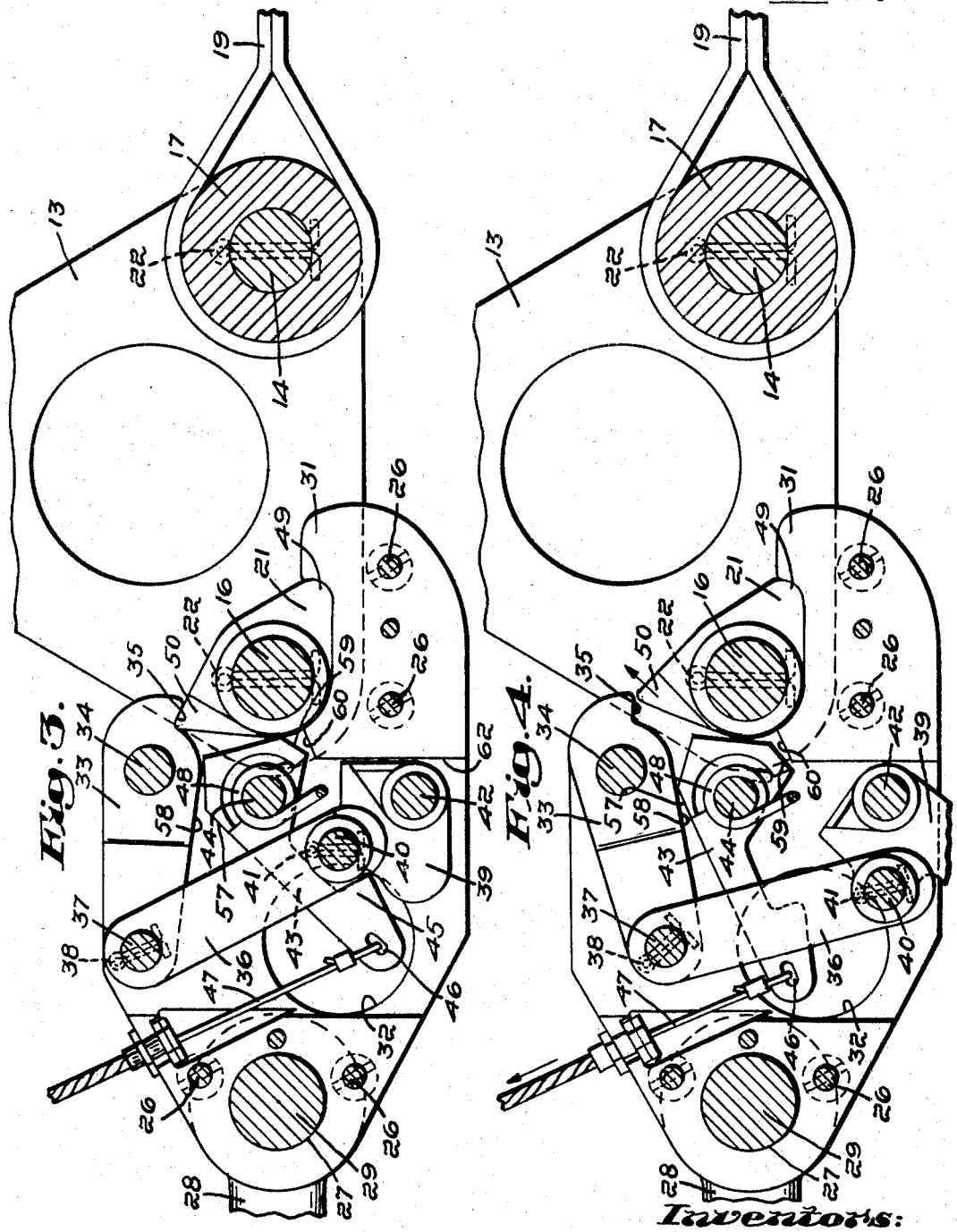

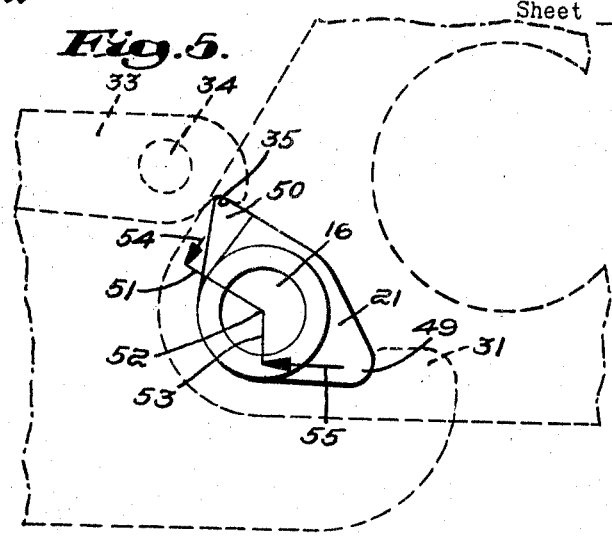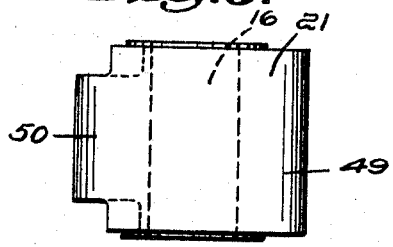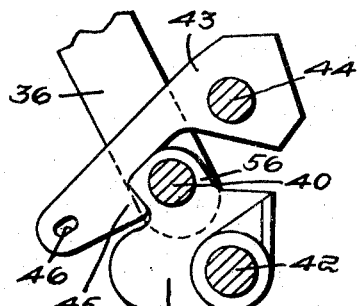

3,425,739
RELEASABLE COUPLING
Richard H. Frost, Littleton, and Ronald L. Criley, Conifer, Colo., and George A. Laliberte, Hudson, and Angelo P. Maschi, Framingham, Mass., assignors, by direct and mesne assignments, to the United States of America as represented by the Secretary of the Army
Filed Nov. 25, 1966, Ser. No. 597,146
U.S. Cl. 294—83　　　　　　　　　　　　10 Claims
Int. Cl. B64d 17/38; B66c 1/38

ABSTRACT OF THE DISCLOSURE

A coupling device for releasably connecting elements of a system under tension load comprising a link assembly and a latch assembly, the link assembly having means for connecting it to one or more of the elements of the system and cam means mounted therein and spaced from the connecting means and freely rotatable within the link assembly, the latch assembly having means for connecting the latch assembly to another of the elements of the system, a hook portion, and latch means to engage the rotatable cam means until it is released, whereupon the cam means rotates out of engagement with the latch assembly separating the element connected to the latch assembly from the element (or elements) connected to the link assembly and continues to rotate freely within the link assembly until the kinetic energy imparted to the cam means during release has been expended.

---

This invention relates generally to a coupling device for releasably connecting elements of a system under tension load. More particularly, the invention relates to a coupling device for releasably connecting an extraction parachute to cargo which is being airdropped from an aircraft and for transferring the force applied by the extraction parachute from the cargo to the deployment means for the recovery parachute system.

In the aerial delivery of military equipment, it is necessary to provide means for extraction of the cargo from the aircraft and other means for safely lowering the cargo to the ground. The first function is usually performed by an extraction parachute and the second by a recovery parachute or a system of recovery parachutes. The extraction parachute is deployed behind the aircraft and applies a tension force to the cargo sufficient to pull the cargo out of the aircraft through an opening in the rear of the aircraft. As soon as the cargo is sufficiently clear of the aircraft to avoid entanglement of the recovery parachute as it is being deployed, the extraction parachute is released from the cargo and transferred to the recovery parachute system. The force exerted by the extraction parachute then serves to rapidly deploy the recovery parachute system which reduces the rate of fall of the cargo to a point where energy-absorbing materials placed under and around the cargo will adequately protect it from damage caused by impact with the ground. In the aerial delivery of cargoes weighing up to 50,000 pounds, the extraction parachute may develop forces in tension up to one and one-half times the cargo weight for extraction of the load from the aircraft; and release of such forces or transfer thereof to the recovery parachute system creates serious problems, particularly where it is desirable to use the coupling device in repeated airdrops.

It has become customary to employ a three-point connecting link in aerial delivery systems of this type. The cargo is attached at one point, the extraction parachute at a second point, and the deployment system for the recovery parachute is attached to the connecting link at the third point. When cargoes are airdropped, high energy must be dissipated at the moment of uncoupling the connecting link from the cargo. It has been necessary to employ bulky and heavy couplings for this purpose since most of this energy has been absorbed within the coupling. One method of absorbing this energy has been to incorporate within the coupling a very heavy rotatable hook-type latch which, upon release from the tension force being being exerted by the extraction parachute, absorbs the high energy by rotating within the coupling. However, this system has the disadvantage that all of the force is concentrated on the latch of the coupling, which therefore must be made very large and heavy to withstand forces in the range of 60,000 pounds without breaking.

It is an object of the present invention to provide a novel and improved coupling device for releasably connecting elements of a system under tension load.

Another object is to provide an improved coupling device for releasably connecting elments of a system under tension load and for transferring the tension load to another element of the system.

A further object is to provide an improved lightweight, compact coupling device for releasably connecting an aerial cargo to an extraction parachute and for transferring the tension load produced by the extraction parachute to the deployment line of a recovery parachute system for the cargo.

Other objects and advantages will be apparent from the following description of one embodiment of the invention, and the novel features will be particularly pointed out hereinafter in connection with the appended claims.

In the accompanying drawings:

FIGURE 1 is a top plan view of a coupling device constructed in accordance with this invention.

FIGURE 2 is a side elevation of the same looking at the coupling device from the right side thereof as shown in FIGURE 1.

FIGURE 3 is a side elevation, partly in section, with portions broken away, of the coupling device shown in FIGURES 1 and 2, the right side plates of the latch assembly and the link assembly being removed, showing the internal parts of the coupling device and their relationships when the latch assembly and link assembly are connected together and the latch assembly is locked in place as would be the case during extraction of a cargo from an aircraft.

FIGURE 4 is a side elevation, similar to FIGURE 3, showing the internal parts of the coupling device and their relationships at the instant of unlocking of the latch assembly and the beginning of separation of the link assembly from the latch assembly.

FIGURE 5 is a side elevation of the rotatable cam, other portions of the link assembly and portions of the latch assembly being shown in phantom, wherein the moments of rotation through which the forces acting on the rotatable cam and vectors representative of the relative magnitudes of the forces acting through the rotatable cam are shown.

FIGURE 6 is a top view of the rotatable cam shown in FIGURE 5.

FIGURE 7 is a fragmentary view, partly in section, with portions broken away and with one of the parallel idler links removed for convenience in showing the relationships of the catch member, the locking link and the idler links when the latch assembly is in a locked condition.

In the illustrated embodiment of the invention, the coupling device comprises a link assembly 10 and a latch assembly 11, to which the link assembly is releasably connected. The link assembly comprises a pair of spaced parallel body members 12 and 13 connected by three spaced cylindrical pins 14, 15 and 16. Pin 14 is provided with freely rotatable cylindrical sleeve 17 for connecting the link assembly with webbing element 19 of a system under tension load, for example a tension load imparted by an extraction parachute (not shown). Pin 15 is provided with freely rotatable cylindrical sleeve 18 for connecting the link assembly with webbing element 20, which may be connected to the deployment line of a recovery parachute system (not shown) attached to a cargo being airdropped. Pin 16 is provided with a freely rotatable cam 21 mounted thereon which is adapted to be releasably connected to the latch assembly, as will be more particularly pointed out hereinafter. Pins 14, 15 and 16 are secured to body members 12 and 13 by means of cotter pins 22.

Latch assembly 11 comprises means for releasably connecting the link assembly to the cargo while it is in the aircraft and until the cargo has been fully extracted from the aircraft by the action of the extraction parachute in applying high tension load to the link assembly. The latch assembly is operable to disconnect the link assembly at a predetermined time or distance from the exit of the aircraft in a manner to be described hereinafter. More particularly, the latch assembly comprises a latch assembly body 23 which comprises a pair of plates 24 and 25 held together by threaded bolts 26. Plates 24 and 25 are conformed to provide a housing for movable latch means adapted to engage the rotatable cam of the link assembly to prevent rotation of the cam and means for disengaging the latch means from the cam to render the latch free to rotate.

One end of the latch assembly body is provided with a hole 27 passing therethrough for attaching a clevis 28, which is secured to the latch assembly body by pin 29 passing through hole 27 and held in place by cotter pin 30. The clevis 28 may be connected to the cargo in any suitable manner, as by webbing, a clevis hook, or otherwise. The other end of the latch assembly body defines a hook portion 31 which is conformed to engage a portion of the rotatable cam 21 of the link assembly in a manner to be described. Inspection hole 32 passes through either or both of plates 24 and 25 and is spaced between hole 27 and hook portion 31 to enable inspection of the parts of the latch assembly mounted inside of the latch assembly body.

A movable latch member 33 and operating mechanism therefor are mounted within the latch assembly body 23. These parts and their interrelationships when locked and unlocked are shown in FIGURES 3 and 4 respectively. Latch member 33 is pivotally mounted within the latch assembly body 23 on pin 34 spaced from hook portion 31 of the latch assembly body so that cam 21 fits between the hook portion and the latch member. Cam engaging surface 35 is formed at one end of the latch member for engaging a portion of rotatable cam 21 in a manner to be described to prevent rotation thereof as long as the latch member is maintained in the locked or closed position bearing against the cam as shown in FIGURE 3. Latch member 33 is pivotally connected at its other end to one end of each of two parallel idler links 36 by pin 37. The idler links are spaced apart by the latch member at the point of connection therewith. Pin 37 is held in place by cotter pin 38. The other ends of idler links 36 are pivotally connected to a portion of locking link 39 by pin 40 and cotter pin 41.

Locking link 39 is pivotally mounted on pin 42 within the latch assembly body and spaced from latch member 33. Locking link 39 is provided with dog 56, shown in greater detail in FIGURE 7, to which idler links 36 are pivotally connected by pin 40, the idler links being spaced apart by the thickness of dog 56. The idler links connect latch member 33 and locking link 39 in such a manner that pivotal movement of the latch member 33 about pin 34 is possible only when the locking link is permitted to rotate about pin 42. When the latch assembly is in the locked or closed position, as shown in FIGURE 3, the central axis of pin 42 is offset to the right of a straight line drawn through the central axes of pins 37 and 40. Thus a force applied to the cam engaging surface of the latch member 33 will be transmitted through the idler links 36 to the locking link tending to rotate the locking link in a counterclockwise direction.

Movement of the locking link is controlled by a catch member 43 pivotally mounted at one end on pin 44 within the latch assembly body between latch member 33 and locking link 39. Catch member 43 is provided with a latching portion 45 spaced from said pivotally mounted end thereof for engaging dog 56 of locking link 39 to prevent rotation thereof. The portion of catch member 43 around pin 44 is preferably enlarged and conformed to provide an abutment surface 57 against which side 58 of the latch member 33 may impact upon release of the load thereon. The portion of catch member 43 on the side 59 opposite said abutment surface is preferably conformed to closely engage the adjacent portion 60 of the latch assembly body 23 such that the impact force applied when the catch member is released may be partially transmitted to the latch assembly body through the enlarged portion of the catch member. In this manner, a stop means is provided for the latch member 33 in order to reduce the impact load on the idler links 36 and the locking link 39 when the latch is released under high tension loading. The enlarged portion of the catch member also serves to balance the mass of the catch member to prevent premature unlocking of the latch assembly from the link assembly which may result from a sudden whipping action on the latch assembly if the mass of the catch member is unbalanced, e.g. the whipping of the latch assembly while the load and the latch assembly are within the aircraft upon application of an extraction force thereto. The other end of catch member 43 extends through the space between the idler links 36 and is provided with a hole 46 therethrough whereby cable 47 is connected to the catch member providing means for the actuation thereof to disengage it from the locking link 39.

When the latch assembly is in a locked condition, as shown in FIGURE 3 and fragmentarily shown in FIGURE 7, dog 56 of the locking link is held by latching portion 45 of catch member 43, thus preventing rotation of locking link 39 and thereby preventing movement of latch member 33. A spring 48 is mounted within the latch assembly body biasing catch member 43 toward engagement with the locking link 39. Catch member 43 is thus prevented from being jarred out of engagement with locking link 39 with the result that a predetermined force must be applied to the catch member by means of cable 47 to disengage the catch member from the locking link. Because of the mechanical advantage developed in the linkage of the latch assembly in combination with the mechanical advantage provided by the cam as described below, the force necessary to disengage the catch member is approximately one thousandth of the applied tension load. Thus a force of about 60 pounds will disengage the catch member when a tension load of 60,000 pounds is applied to the coupling.

As shown in FIGURE 5, rotatable cam 21 has a first portion 49 which is conformed to engage the hook portion 31 of the latch assembly body and a second portion 50 which is conformed to engage the latch member 33 at cam engaging surface 35 thereof when the link assembly is locked in connection with the latch assembly. The rotatable cam is conformed so that the force applied thereto by the hook portion tends to rotate the cam in a clockwise direction out of engagement with said hook portion. In the locked position, latch member 33 prevents such rotation. The cam 21 is further conformed to provide for the application of force thereto by the catch member 33 at a substantially greater moment arm 51 about the axis of rotation 52 of the cam than the moment arm 53 at which force is applied to the cam by the hook portion. Consequently, the latch member 33 is required to exert less force on second portion 50 of the cam to maintain the latch assembly locked than the force being exerted on first portion 49 of the cam by hook portion 31 under the influence of a tension load, such as that of an extraction parachute. The lesser force exerted by the latch member is represented by vector 54 and the greater force exerted by the hook portion is represented by vector 55. Thus, it will be apparent that the rotatable cam is constructed so as to provide a mechanical advantage to latch member 33. When forces of the order of 60,000 pounds are involved, even a small mechanical advantage, such as 1.25:1 to 2:1, is significant in terms of reducing the weight and bulk of the coupling device required to handle such forces.

In the use of the coupling device of the invention, when heavy loads, e.g. of the order of 25,000 to 50,000 pounds, are to be airdropped from the aircraft, the latch assembly is connected to a cargo (not shown) in an aircraft by means of clevis 28 and webbing 61 or other means. The link assembly containing the rotatable cam is locked in connection with the latch assembly as shown in FIGURE 2 prior to the application of a tension load to the link assembly by manually releasing the catch member 43 to permit the latch member 33 to be moved to its open position while the cam 21 is positioned in the hook portion. An extraction parachute (not shown) is connected to the link assembly by means of webbing element 19, which is snubbed around rotatable cylindrical sleeve 17. The link assembly is similarly connected by means of webbing element 20, snubbed around rotatable cylindrical sleeve 18, to the deployment means for one or more recovery parachutes (not shown). It is to be understood that webbing element 20 will be of sufficient length to remain slack until the link assembly is released from the latch assembly. Cable 47 is connected to a triggering device (not shown) which is activated the moment the cargo leaves the aircraft under the pull of the extraction parachute. Sufficient force is exerted on cable 47 by the triggering device to overcome the bias of spring 48 and the friction between latching portion 45 of catch member 43 and dog 56 of locking link 39.

When the latching portion is pulled clear of dog 56, the locking link becomes free to rotate in a counterclockwise direction as shown in FIGURES 3 and 4 permitting the latch member 33 to move out of engagement with cam 21 as the force exerted by the extraction parachute is transmitted through the link assembly and the rotatable cam. The cam then rotates out of engagement with the hook portion of the latch assembly as shown in FIGURE 4 completing the disconnect action. In so doing, the cam imparts a large force to latch member 33. This force is transmitted partially through idler links 36 to locking link 39 which rotates on pin 42 in a counterclockwise direction causing the locking link 39 to impact the latch assembly body at surface 62. A substantial portion of this force is transmitted from latch member 33 through the enlarged portion of catch member 43 to the latch assembly body at surface 60 as a result of the impacting of side 58 of latch member 33 against abutment surface 57 of catch member 43 and the impacting of side 59 of catch member 43 against surface 60 of latch assembly body 23.

The kinetic energy imparted to the cam 21 as it rotates out of engagement with the hook portion 31 of the latch assembly body is dissipated by rotation of the cam 21 on pin 16 of the link assembly 10.

Following disengagement of the rotatable cam from the latch assembly, the force being exerted by the extraction parachute is transferred to the deployment lines for the recovery parachute through webbing element 20. The latch assembly remains attached to the cargo and descends to earth therewith. The link assembly remains connected to the extraction parachute and descends along with the housing for the recovery parachute, which was removed during deployment thereof. Both latch assembly and link assembly can be recovered for use in subsequent airdrops.

Although the invention has been described in terms of transferring the force exerted by an extraction parachute from the cargo to the recovery parachute deploying means, it is to be understood that it is not limited to such usage. For example, if it is desired to deliver a cargo by free fall, the coupling device may be employed in the extraction of the cargo from an aircraft and then in disconnecting the extraction parachute from the cargo. It may also be employed in other situations for simply uncoupling a load from a source of tension acting upon the load. The invention is, therefore, useful in hauling loads on the ground or on water and uncoupling at a preselected time, as well as in airdrop operations.

The force transfer device of this invention has several advantages over the prior art force transfer devices which utilized a large hook rotatably mounted within the latch assembly. Replacement of the rotatable hook by a rotatable cam and location of the latter in the link assembly, where it absorbs a portion of the energy by freely rotating therein, makes possible a marked reduction in weight and size of the latch assembly. The latch assembly of the present invention is, therefore, much more compact and much lighter than any previously known coupling device of comparable capacity. The coupling device of the invention has the further advantage of being reusable many times since the device is not excessively damaged by the release of large amounts of energy within the coupling device upon disconnection of the source of high tension from the load.

We claim:
1. A coupling device for releasably connecting elements of a system under tension load comprising in combination
   a link assembly and
   a latch assembly,
   said link assembly comprising means for connecting same to one of said elements of said system and cam means mounted therein and spaced from said connecting means, said cam means being freely rotatable within said link assembly,
   said latch assembly comprising means for connecting hook portion conformed to engage said rotatable same to another of said elements of said system, a cam means of said link assembly and to impart a rotating moment to said cam means when a tension load is applied longitudinally of said coupling device, said moment tending to dislodge said cam means from said hook portion, movable latch means adapted to releasably engage said cam means to prevent rotation thereof when said cam means are engaged in said hook portion and means for releasably locking said latch means in engagement with said cam means,
   whereby said latch means may be disengaged from said cam means, permitting said cam means to rotate out of engagement with said hook portion allowing said link assembly and said latch assembly to separate under a longitudinally applied tension load and said cam means may continue to rotate freely within said link assembly until the energy imparted thereto by said rotating moment is expended.

2. A coupling device as in claim 1 wherein said rotatable cam means of said link assembly is conformed to reduce the load applied to said latch means by said cam means to a load which is less than the load applied to said cam means by said hook portion.

3. A coupling device as in claim 1 wherein said rotatable cam means comprises
   a first portion conformed to engage said hook portion of said latch assembly and to provide a predetermined moment arm about the axis of rotation of said cam means for the load applied thereto by said hook portion and
   a second portion conformed to engage said latch means and to provide a predetermined moment arm about the axis of rotation of said cam means for the load applied thereto by said latch means in preventing rotation of said cam means, the moment arm provided by said second portion being greater than the moment arm provided by said first portion, whereby the load applied to said latch means is less than the load applied to said hook portion.

4. A coupling device as in claim 1 wherein said latch means comprises a latch member pivotally mounted in said latch assembly body for rocking movement between a first position wherein said latch member engages said cam means to prevent rotation thereof and a second position wherein said latch member is disengaged from said cam means, said cam means biasing said latch member toward said second position when a tension load is applied longitudinally of said coupling device.

5. A coupling device as in claim 1 wherein said latch means comprises an elongated latch member having a cam means engaging surface formed in one end thereof, said latch member being pivotally mounted within said latch assembly spaced from said hook portion thereof, a locking link pivotally mounted in said latch assembly spaced from said latch member, an idler link connecting said locking link with the other end of said latch member, a catch member pivotally mounted within said latch assembly between said locking link and said latch member, said catch member having means for engaging said locking link to prevent rotation thereof, and spring means mounted in said latch assembly for biasing said catch member toward engagement with said locking link, whereby movement of said catch member against the biasing force of said spring means releases said locking link for rotation permitting said latch member to pivot out of engagement with said cam means.

6. A coupling device as in claim 1 wherein said link assembly is provided with separate spaced means for connecting same to at least two separate elements of said system, whereby upon separation of said link assembly and said latch assembly said tension load may be transferred from said element connected to said latch assembly to another of said elements in said system.

7. A coupling device as in claim 1 wherein said link assembly comprises a pair of spaced parallel body members having said rotatable cam means and said connecting means mounted therebetween.

8. A coupling device as in claim 6 wherein said link assembly comprises a pair of spaced parallel body members connected by a plurality of cylindrical pins, one of said pins having said cam means rotatably mounted thereon and at least two of the remainder of said pins providing means for connecting separate elements of said system to said link assembly.

9. A coupling device as in claim 8 wherein said pins providing means for connecting separate elements of said system to said link assembly are provided with connecting means rotatably mounted thereon.

10. A coupling device as in claim 5 wherein said link assembly comprises a pair of spaced parallel body members connected by a plurality of cylindrical pins, one of said pins having said cam means rotatably mounted thereon and at least two of the remainder of said pins providing means for connecting separate elements of said system to said link assembly, said pins providing means for connecting separate elements of said system to said link assembly being provided with connecting means rotatably mounted thereon, and said rotatably mounted cam means comprises a first portion conformed to engage said hook portion of said latch assembly and to provide a predetermined moment arm about the axis of rotation of said cam means for the load applied thereto by said hook portion and a second portion conformed to engage said latch means and to provide a predetermined moment arm about the axis of rotation of said cam means for the load applied thereto by said latch means in preventing rotation of said cam means, the moment arm provided by said second portion being greater than the moment arm provided by said first portion, whereby the load applied to said latch means is less than the load applied to said hook portion.

References Cited

UNITED STATES PATENTS 3,237,264   3/1966   Turolla _____ 24—201

EVON C. BLUNK, *Primary Examiner.*

ROBERT D. GUIOD, *Assistant Examiner.*

U.S. Cl. X.R.

24—201